United States Patent
Ando

(10) Patent No.: US 8,081,679 B2
(45) Date of Patent: Dec. 20, 2011

(54) IMAGE PROCESSING APPARATUS

(75) Inventor: Tsutomu Ando, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1145 days.

(21) Appl. No.: 11/623,251

(22) Filed: Jan. 15, 2007

(65) Prior Publication Data

US 2007/0177808 A1    Aug. 2, 2007

(30) Foreign Application Priority Data

Jan. 31, 2006 (JP) ................. 2006-022508
Dec. 26, 2006 (JP) ................. 2006-348890

(51) Int. Cl.
*H04N 7/12* (2006.01)
*H04N 11/02* (2006.01)
*H04N 11/04* (2006.01)
*G06K 9/00* (2006.01)

(52) U.S. Cl. ............... 375/240.03; 375/240.05; 382/253

(58) Field of Classification Search ............... 375/240.03
See application file for complete search history.

(56) References Cited

U.S. PATENT DOCUMENTS 5,650,860 A * 7/1997 Uz .................. 382/253
6,160,846 A * 12/2000 Chiang et al. ........... 375/240.05
2002/0136295 A1 9/2002 Sato
2005/0147162 A1 7/2005 Mihara
2006/0171457 A1 * 8/2006 DeGarrido et al. ...... 375/240.03

FOREIGN PATENT DOCUMENTS

JP    10-224786 A    8/1998
JP    2004-140867 A    5/2004
JP    2005-0005862 A    1/2005

* cited by examiner

*Primary Examiner* — Christopher S Kelley
*Assistant Examiner* — Hee-Yong Kim

(57) ABSTRACT

An image processing apparatus includes a quantizing unit configured to quantize an input moving image signal using a set quantization scale; a coding unit configured to perform variable length coding on an output of the quantizing unit; an activity detecting unit configured to detect an activity of the input moving image signal; a quantization-scale determining unit configured to determine the quantization scale; a changing unit configured to change a value determined by the quantization-scale determining unit, and to set the changed value, as the quantization scale; and a filling level detecting unit configured to detect the filling level of a virtual buffer in a decoder which decodes the coded moving image signal, and to control the changing unit such that the degree of change in the quantization scale caused by use of the activity is reduced as the detected filling level decreases.

5 Claims, 7 Drawing Sheets

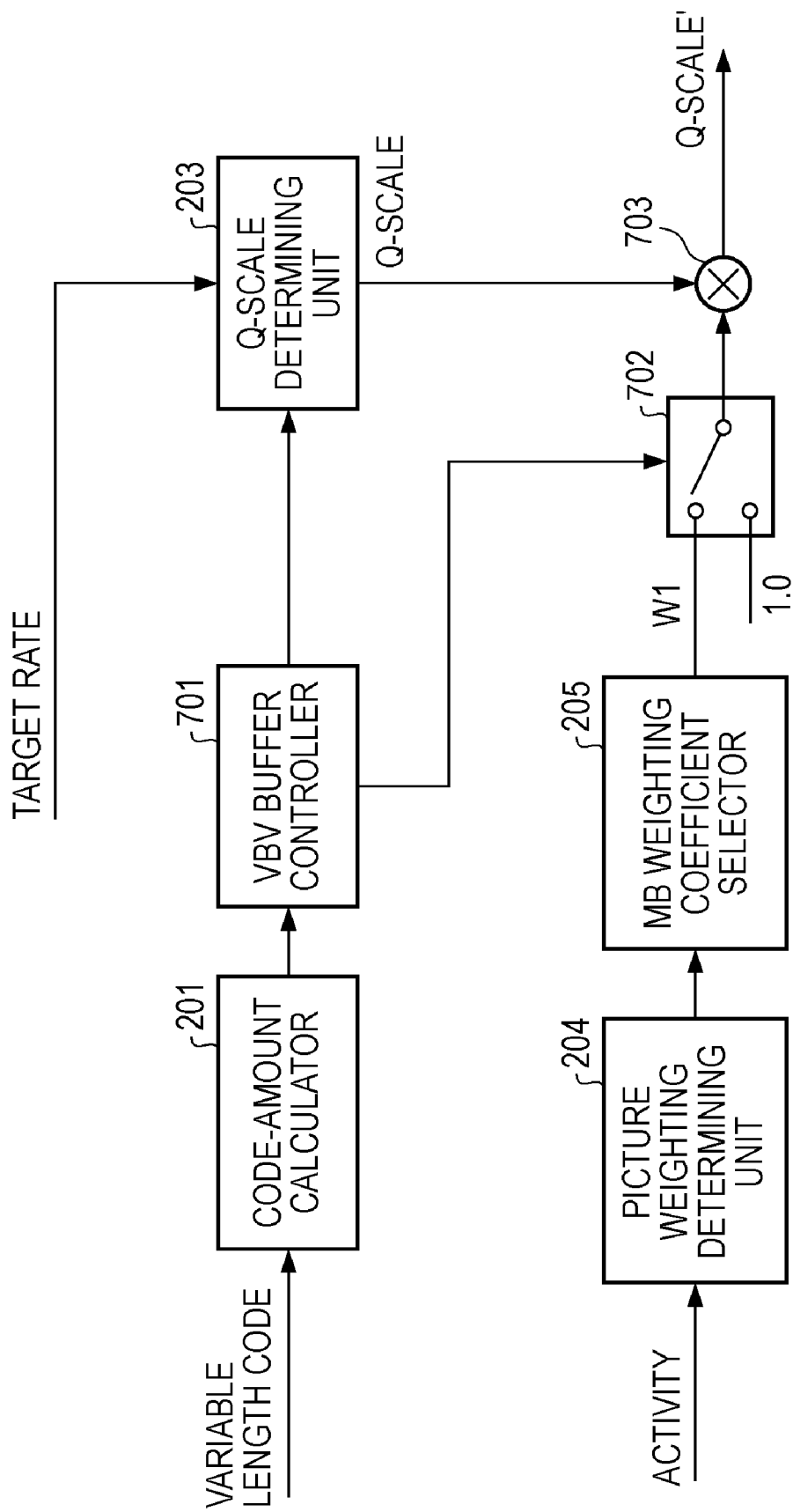

IMAGE PROCESSING APPARATUS

BACKGROUND OF THE INVENTION

1. Field of the Invention

The present invention relates to image processing apparatuses and particularly to coding of image signals.

2. Description of the Related Art

The Moving Picture Experts Group (MPEG) standard and the H.264 (or MPEG4-advanced video coding (AVC)) standard are known as technical standards for coding image signals. These coding standards use techniques, such as discrete cosine transform (DCT), quantization, and variable length coding, and combine intraframe coding and interframe predictive coding to achieve coding of moving image signals.

Also, for example, the MPEG2 standard defines a video buffer verifier (VBV) buffer model (i.e., virtual buffer model) to ensure real-time processing during decoding. In the VBV buffer model, the amount of data in a buffer memory during decoding must be maintained at a level between the upper limit of the VBV buffer size and zero byte. For example, at main profile at main level (MP@ML), the maximum buffer size is specified at 1835008 bits.

A known technique for maintaining such a VBV buffer model is to estimate the filling level of a VBV buffer on the basis of the amount of codes generated per unit time, and thus control a quantization step width (i.e., Q-scale).

In a known MPEG coding technique, an index called "activity" indicating the feature value (i.e., complexity) of an image is used to weight a quantization step, and thus to improve image quality (e.g., see Japanese Patent Laid-Open No. 10-224786 corresponding to U.S. patent application Publication No. 2005/0147162).

However, if the quantization step is weighted using the activity of an image without reference to the amount of codes actually generated, the amount of generated codes may vary and an underflow of coded data may occur.

SUMMARY OF THE INVENTION

The present invention is directed to addressing such problems, and to providing an apparatus capable of coding image signals and improving image quality while appropriately controlling the amount of codes.

According to an aspect of the present invention, an image processing apparatus is provided which includes a quantizing unit configured to quantize an input moving image signal using a set quantization scale; a coding unit configured to perform variable length coding on an output of the quantizing unit; an activity detecting unit configured to detect an activity of the input moving image signal; a quantization-scale determining unit configured to determine the quantization scale on the basis of the amount of variable length codes output from the coding unit; a changing unit configured to change, on the basis of the activity detected by the activity detecting unit, a value determined by the quantization-scale determining unit, and to set the changed value, as the quantization scale, in the quantizing unit; and a filling level detecting unit configured to detect, on the basis of the amount of variable length codes output from the coding unit, the filling level of a virtual buffer in a decoder which decodes the coded moving image signal, and to control the changing unit such that the degree of change in the quantization scale caused by use of the activity is reduced as the detected filling level decreases.

According to another aspect of the present invention, the changing unit may include a coefficient generating section configured to generate a weighting coefficient on the basis of the activity; and a quantization-scale changing section configured to change, on the basis of the weighting coefficient, the quantization scale determined by the quantization-scale determining unit, wherein the filling level detecting unit controls the coefficient generating section such that a range in which the quantization scale changes on the basis of the weighting coefficient is narrowed as the detected filling level decreases.

According to yet another aspect of the present invention, the coefficient generating section may include a weighting-coefficient determining part configured to determine a weighting coefficient according to the activity; and a coefficient converting part configured to convert the weighting coefficient output from the weighting-coefficient determining part, and output the converted weighting coefficient to the quantization-scale changing section, wherein the filling level detecting unit controls the coefficient converting part on the basis of the detected filling level.

Moreover, according to another aspect of the present invention, the filling level detecting unit controls the coefficient converting part such that if the filling level falls below a threshold value, a range in which the quantization scale changes on the basis of the weighting coefficient becomes narrower than in the case where the filling level is equal to or greater than the threshold value.

Furthermore, according to another aspect of the present invention, the moving image signal may include a plurality of macroblocks, each macroblock including "n" pixels where "n" is a positive integer, wherein the coefficient generating section generates a weighting coefficient for each macroblock, and the quantization-scale determining unit determines a quantization scale for each macroblock.

Additionally, according to another aspect of the present invention, the changing unit may include an activity converting section configured to convert the activity detected by the activity detecting unit; a coefficient generating section configured to generate a weighting coefficient on the basis of the activity output from the activity converting section; and a quantization-scale changing section configured to change, on the basis of the weighting coefficient, the quantization scale determined by the quantization-scale determining unit, wherein the filling level detecting unit controls the activity converting section such that a range in which the quantization scale changes on the basis of the weighting coefficient is narrowed as the detected filling level decreases.

Also, according to another aspect of the present invention, the moving image signal may include a plurality of macroblocks, each macroblock including "n" pixels where "n" is a positive integer, wherein the activity detecting unit detects the activity for each frame, and the weighting-coefficient determining part determines the weighting coefficient for each macroblock.

And, according to yet another aspect of the present invention, the filling level detecting unit controls the activity converting section such that if the filling level falls below a threshold value, a range in which the quantization scale changes on the basis of the weighting coefficient becomes narrower than in the case where the filling level is equal to or greater than the threshold value.

Still further, according to yet another aspect of the present invention, an image processing apparatus is provided including a quantizing unit configured to quantize an input moving image signal using a set quantization scale; a coding unit configured to perform variable length coding on an output of the quantizing unit; an activity detecting unit configured to detect an activity of the input moving image signal; a quantization-scale determining unit configured to determine the quantization scale on the basis of the amount of variable length codes output from the coding unit; a changing unit configured to change, on the basis of the activity detected by the activity detecting unit, the quantization scale determined by the quantization-scale determining unit, and to set the changed quantization scale in the quantizing unit; a filling level detecting unit configured to detect, on the basis of the amount of variable length codes output from the coding unit, the filling level of a virtual buffer in a decoder which decodes the coded moving image signal; and a control unit configured to perform control, according to the filling level detected by the filling level detecting unit, as to whether the quantization scale determined by the quantization-scale determining unit is to be changed on the basis of the activity.

Moreover, in another aspect of the present invention, the control unit controls the changing unit such that if the filling level falls below a threshold value, the quantization scale determined by the quantization-scale determining unit is output without being changed, and if the filling level is equal to or greater than the threshold value, the quantization scale determined by the quantization-scale determining unit is changed on the basis of the activity and output.

Additionally, according to still further another aspect of the present invention, the changing unit may include a coefficient generating section configured to generate a weighting coefficient on the basis of the activity; a calculating section configured to performs calculations using the weighting coefficient and the quantization scale determined by the quantization-scale determining unit; and a selecting section configured to select either one of an output from the calculating section and the quantization scale determined by the quantization-scale determining unit, wherein the control unit controls the selecting section such that if the filling level falls below a threshold value, the selecting section selects the quantization scale determined by the quantization-scale determining unit, and if the filling level is equal to or greater than the threshold value, the selecting section selects the output from the calculating section.

Also, according to another aspect of the present invention, the changing unit may include a coefficient generating section configured to generate a weighting coefficient on the basis of the activity; a selecting section configured to select either one of the weighting coefficient and a fixed value; and a calculating section configured to perform calculations using an output from the selecting section and the quantization scale determined by the quantization-scale determining unit, wherein the control unit controls the selecting section such that if the filling level falls below a threshold value, the selecting section selects the fixed value, and if the filling level is equal to or greater than the threshold value, the selecting section selects the weighting coefficient.

In another aspect of the present invention, an image processing method is provided including quantizing an input moving image signal using a set quantization scale; performing variable length coding on the quantized moving image signal; detecting an activity of the input moving image signal; determining the quantization scale on the basis of the amount of variable length codes obtained from performing variable length coding on the quantized moving image signal; changing the determined quantization scale on the basis of the detected activity, and setting the changed quantization scale as the quantization scale; and detecting, on the basis of the amount of variable length codes, the filling level of a virtual buffer in a decoder which decodes the coded moving image signal, and controlling the changing of the determined quantization scale such that the degree of change in the quantization scale caused by use of the activity is reduced as the detected filling level decreases.

Furthermore, according to yet another aspect of the present invention, an image processing method is provided which includes quantizing an input moving image signal using a set quantization scale; performing variable length coding on the quantized moving image signal; detecting an activity of the input moving image signal; determining the quantization scale on the basis of the amount of variable length codes obtained from performing variable length coding on the quantized moving image signal; changing the determined quantization scale on the basis of the detected activity, and setting the changed quantization scale as the quantization scale; detecting, on the basis of the amount of variable length codes, the filling level of a virtual buffer in a decoder which decodes the coded moving image signal; and performing control, according to the detected filling level, as to whether the determined quantization scale is to be changed on the basis of the activity.

Also, according to another aspect of the present invention, an image processing apparatus is provided which includes a quantizing unit configured to quantize an input moving image signal using a set quantization scale; a coding unit configured to perform variable length coding on an output of the quantizing unit; an activity detecting unit configured to detect an activity of the input moving image signal; a quantization-scale determining unit configured to determine the quantization scale on the basis of the amount of variable length codes output from the coding unit; a changing unit configured to change, on the basis of the activity detected by the activity detecting unit, a value determined by the quantization-scale determining unit, and to set the changed value, as the quantization scale, in the quantizing unit; and a filling level detecting unit configured to detect the data rate of moving image data output from the coding unit, and to control the changing unit such that the degree of change in the quantization scale caused by use of the activity is reduced as the detected data rate decreases.

And, according to another aspect of the present invention, a computer readable medium contains computer-executable instructions for coding images. Here, the medium includes computer-executable instructions for quantizing an input moving image signal using a set quantization scale; computer-executable instructions for performing variable length coding on the quantized moving image signal; computer-executable instructions for detecting an activity of the input moving image signal; computer-executable instructions for determining the quantization scale on the basis of the amount of variable length codes obtained from performing variable length coding on the quantized moving image signal; computer-executable instructions for changing the determined quantization scale on the basis of the detected activity, and setting the changed quantization scale as the quantization scale; and computer-executable instructions for detecting, on the basis of the amount of variable length codes, the filling level of a virtual buffer in a decoder which decodes the coded moving image signal, and controlling the changing the determined quantization scale such that the degree of change in the quantization scale caused by use of the activity is reduced as the detected filling level decreases.

Moreover, according to another aspect of the present invention, a computer readable medium containing computer-executable instructions for coding images is provided. Here, the medium includes computer-executable instructions for quantizing an input moving image signal using a set quantization scale; computer-executable instructions for performing variable length coding on the quantized moving image signal;

computer-executable instructions for detecting an activity of the input moving image signal; computer-executable instructions for determining the quantization scale on the basis of the amount of variable length codes obtained from performing variable length coding on the quantized moving image signal; computer-executable instructions for changing the determined quantization scale on the basis of the detected activity, and setting the changed quantization scale as the quantization scale; computer-executable instructions for detecting, on the basis of the amount of variable length codes, the filling level of a virtual buffer in a decoder which decodes the coded moving image signal; and computer-executable instructions for performing control, according to the detected filling level, as to whether the determined quantization scale is to be changed on the basis of the activity.

Further features and aspects of the present invention will become apparent from the following description of exemplary embodiments with reference to the attached drawings.

BRIEF DESCRIPTION OF THE DRAWINGS

FIG. 7 illustrates another exemplary configuration of the rate controller.

DESCRIPTION OF THE EMBODIMENTS

Exemplary embodiments, various features and aspects of the present invention will now herein be described with reference to the drawings.

First Exemplary Embodiment

Figure 1:
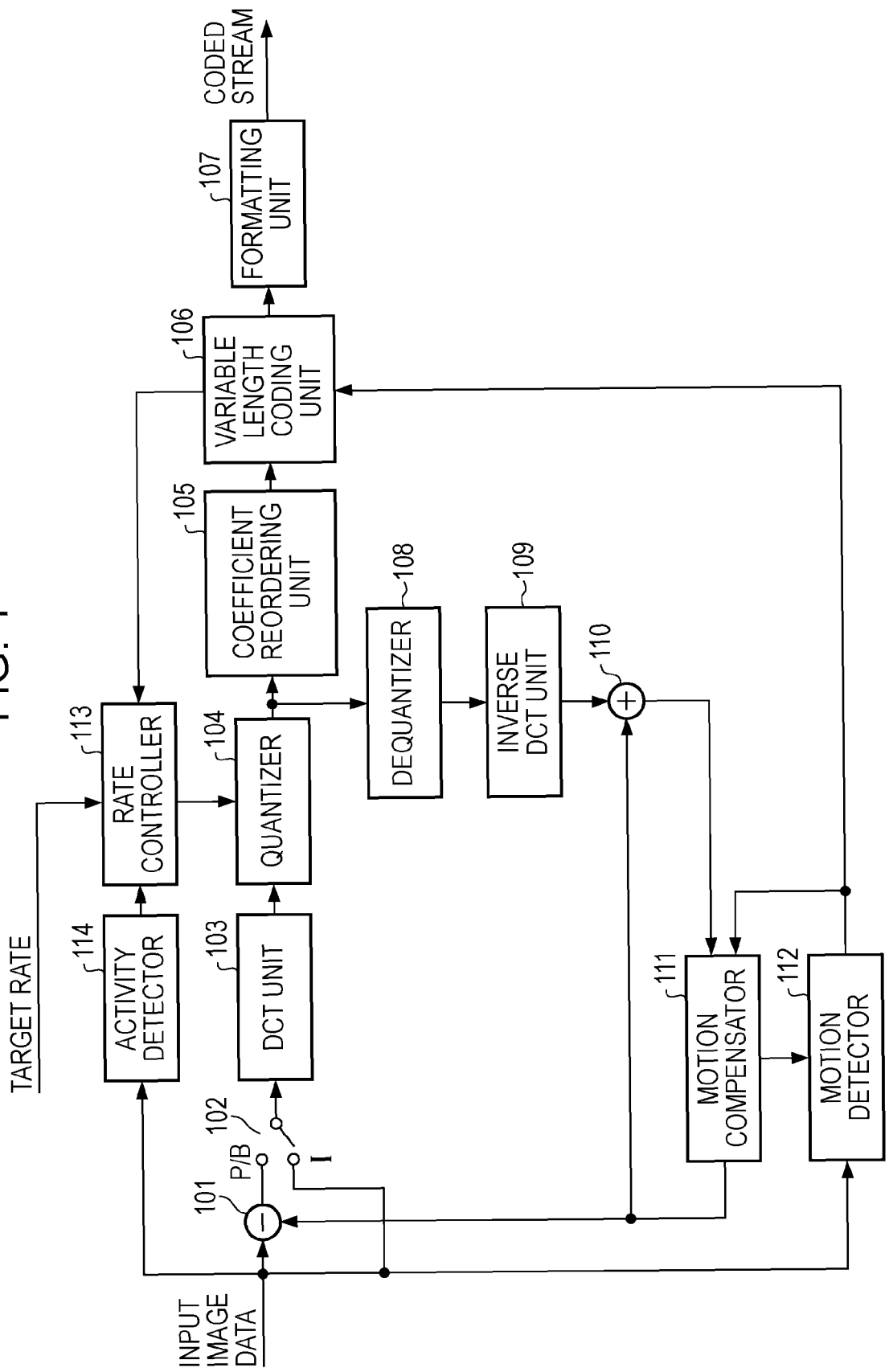
FIG. 1 illustrates a configuration of a coding apparatus according to at least one exemplary embodiment of the present invention.

FIG. 1 illustrates a configuration of a coding apparatus according to at least one exemplary embodiment of the present invention. The coding apparatus of FIG. 1 is capable of coding input moving image signals according to the MPEG2 standard.

Referring to FIG. 1, moving image data supplied from a video camera, an input terminal, or the like is input frame-by-frame and supplied to a subtracter 101, a switch 102, a motion compensator 111, a motion detector 112, and an activity detector 114.

In the MPEG2 standard, a moving image signal is coded frame-by-frame by the combination of intraframe coding (I-pictures), interframe forward predictive coding (P-pictures), and interframe bidirectional predictive coding (B-pictures).

For coding I-pictures, the switch 102 is connected to an "I" side and allows an input image signal of one frame to be directly supplied to a DCT unit 103. The DCT unit 103 performs DCT processing on each DCT block of the input image signal, each DCT block being composed of eight pixels (vertical) by eight pixels (horizontal), and outputs the DCT-processed image signal to a quantizer 104. The quantizer 104 uses a Q-scale set, as described below, by a rate controller 113 to quantize DCT coefficients from the DCT unit 103, and outputs the quantized coefficients to a coefficient reordering unit 105 and a dequantizer 108. The coefficient reordering unit 105 reorders, according to a specified order, the quantized coefficients output from the quantizer 104, and outputs the reordered quantized coefficients to a variable-length coding unit 106. The variable-length coding unit 106 codes the input quantized coefficients by using variable-length coding, such as Huffman coding, and outputs the coded quantized coefficients to a formatting unit 107 and the rate controller 113. The formatting unit 107 adds various control signals defined by the MPEG standard to coded signals, and generates and outputs a coded stream.

The output from the quantizer 104 is dequantized by the dequantizer 108, inverse-DCT-processed by the inverse DCT unit 109, and is output to an adder 110. While a reference image signal is normally supplied from the motion compensator 111 to the adder 110, none is supplied to the adder 110 in the case of an I-picture, which is obtained by intraframe coding. Thus, a signal from the inverse DCT unit 109 is directly output to the motion compensator 111.

The motion compensator 111 has memory for storing image signals corresponding to two frames serving as reference frames. Image signals of I-pictures and P-pictures from the adder 110 are sequentially stored in the memory of the motion compensator 111. For coding P-pictures and B-pictures, the motion detector 112 compares an input image signal to an image signal of a reference frame stored in the memory of the motion compensator 111 with respect to each macroblock (MB), and detects a motion vector.

In the MPEG2 standard, one macroblock (MB) is composed of 16 by 16 pixels. According to the motion vector detected in the manner described above, the motion compensator 111 reads an image signal of a reference frame with respect to each macroblock, and outputs the read image signal to the subtracter 101 and to the adder 110.

For processing P-pictures and B-pictures, the subtracter 101 calculates a difference between an input image signal and an image signal of a reference frame output from the motion compensator 111, and outputs the calculated difference to the DCT unit 103 via the switch 102.

Then, as in the case of I-pictures, DCT, quantization, and variable length coding are performed. The formatting unit 107 thus outputs a coded stream.

A quantized coefficient for a P-picture is dequantized, inverse-DCT-processed, added by the adder 110 to an image signal of a reference frame, and newly stored as an image signal of a reference frame in the memory of the motion compensator 111. As for a B-picture, such an image signal of a reference frame is not stored in the memory of the motion compensator 111, as the B-picture is not used as a reference frame.

On the other hand, the activity detector 114 uses a known technique to calculate an activity indicating the complexity of the input image signal and outputs the calculated activity to the rate controller 113. The rate controller 113 determines a Q-scale for quantization on the basis of the activity from the activity detector 114, the amount of codes from the variable-length coding unit 106, and a target code rate.

Figure 2:
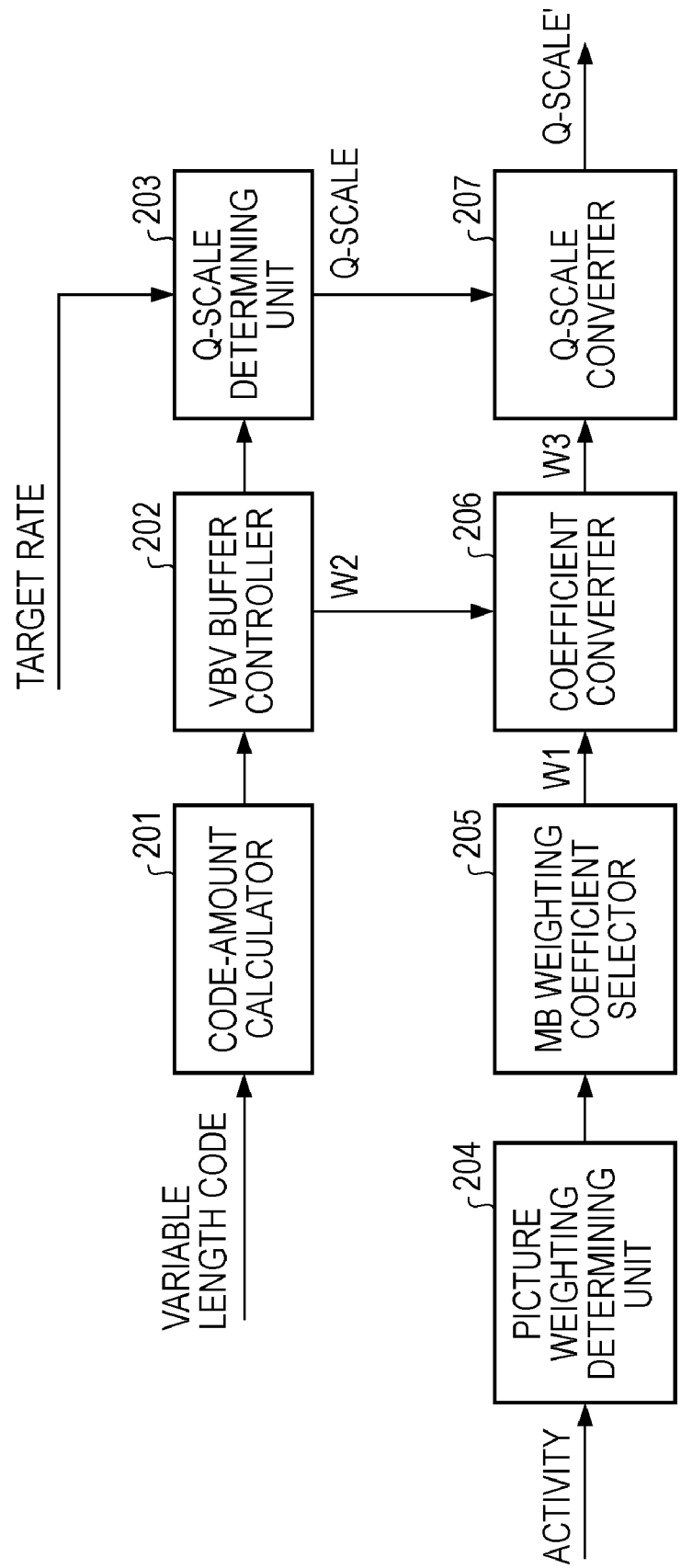
FIG. 2 illustrates an exemplary configuration of a rate controller.

FIG. 2 illustrates an example configuration of the rate controller 113 according to a first exemplary embodiment of the present invention.

Referring to FIG. 2, a code-amount calculator 201 sequentially adds up variable length codes output from the variable-length coding unit 106 and outputs the resulting value to a VBV buffer controller 202. On the basis of the value from the code-amount calculator 201, the VBV buffer controller 202 estimates the filling level of a VBV buffer and outputs the estimated value to a Q-scale determining unit 203. At the same time, the VBV buffer controller 202 generates, on the basis of the state of the VBV buffer, a coefficient W2 for controlling the effect of a weighting coefficient and outputs the coefficient W2 to a coefficient converter 206. The Q-scale determining unit 203 includes a rate controller which performs rate control at a group of pictures (GOP) level and a rate controller which performs rate control at a picture level on the basis of the result of the rate control at the GOP level. On the basis of the result of the rate control performed at the picture level and the state of the VBV buffer estimated by the VBV buffer controller 202, the Q-scale determining unit 203 determines a Q-scale value for each MB and outputs the determined value to a Q-scale converter 207.

On the other hand, activity information for each MB from the activity detector 114 is supplied to a picture weighting determining unit 204, which generates a weighting coefficient on the basis of an activity for each MB. An MB weighting-coefficient selector 205 receives a weighting coefficient for each MB and outputs the weighting coefficient as "W1" to the coefficient converter 206. The coefficient converter 206 performs the following operation using the weighting coefficient W1 and the control value (i.e., coefficient) W2 from the VBV buffer controller 202 to determine a converted weighting coefficient W3:

$$W3 = (W1 - Wr/2) \times W2 + Wr/2$$

where Wr represents the variable range of W1.

For example, substituting W2=1 into the above equation produces W3=W1. In this case, the weighting coefficient W1 is output without being modified. If W1 ranges from 0.5 to 2.0 and W2=0.5 is substituted into the above equation, W3 ranges from 0.625 to 1.375. In other words, by making the variation range of W3 narrower than that of W1, it is possible to control the effect of the weighting coefficient W1 on the Q-scale, the weighting coefficient W1 being based on the activity.

More specifically, if the filling level of variable length codes in the VBV buffer is low and an underflow is likely to occur, the VBV buffer controller 202 sets the value of W2 such that the effect of the weighting coefficient W1 can be reduced.

On the other hand, if the sufficiency of codes in the VBV buffer is high, the VBV buffer controller 202 sets the value of W2, for example, to 1.0 such that the effect of the weighting coefficient W1 based on the activity is reflected on the Q-scale.

The converted weighting coefficient W3 obtained in the above-described manner is output to the Q-scale converter 207. The Q-scale converter 207 performs the following operation using the Q-scale value from the Q-scale determining unit 203 and the converted weighting coefficient W3 from the coefficient converter 206, for the conversion of the Q-scale value:

$$Q\text{-scale}' = Q\text{-scale} \times W3$$

The Q-scale' obtained in this manner is set, in the quantizer 104, as a quantization scale for the MB.

Thus, in the present exemplary embodiment, the Q-scale value from the Q-scale determining unit 203 is multiplied by the converted weighting coefficient W3 from the coefficient converter 206. Therefore, if the sufficiency of variable length codes in the VBV buffer is low and an underflow is likely to occur, the VBV buffer controller 202 sets the value of W2 such that the weighting coefficient W3 has a value near 1.0.

Specifically, the VBV buffer controller 202 compares the sufficiency of codes in the VBV buffer (i.e., the amount of codes stored in the VBV buffer) with a predetermined threshold value. If the code sufficiency falls below the threshold value, the VBV buffer controller 202 determines that an underflow is likely to occur, and sets the value of W2 such that the weighting coefficient W3 has a value near 1.0.

On the other hand, if the sufficiency is equal to or greater than the threshold value, the VBV buffer controller 202 sets the value of W2 such that the effect of the weighting coefficient W1 based on the activity is reflected on the weighting coefficient W3.

The foregoing process will be further described with reference to FIG. 4 and FIG. 5.

Figure 4:
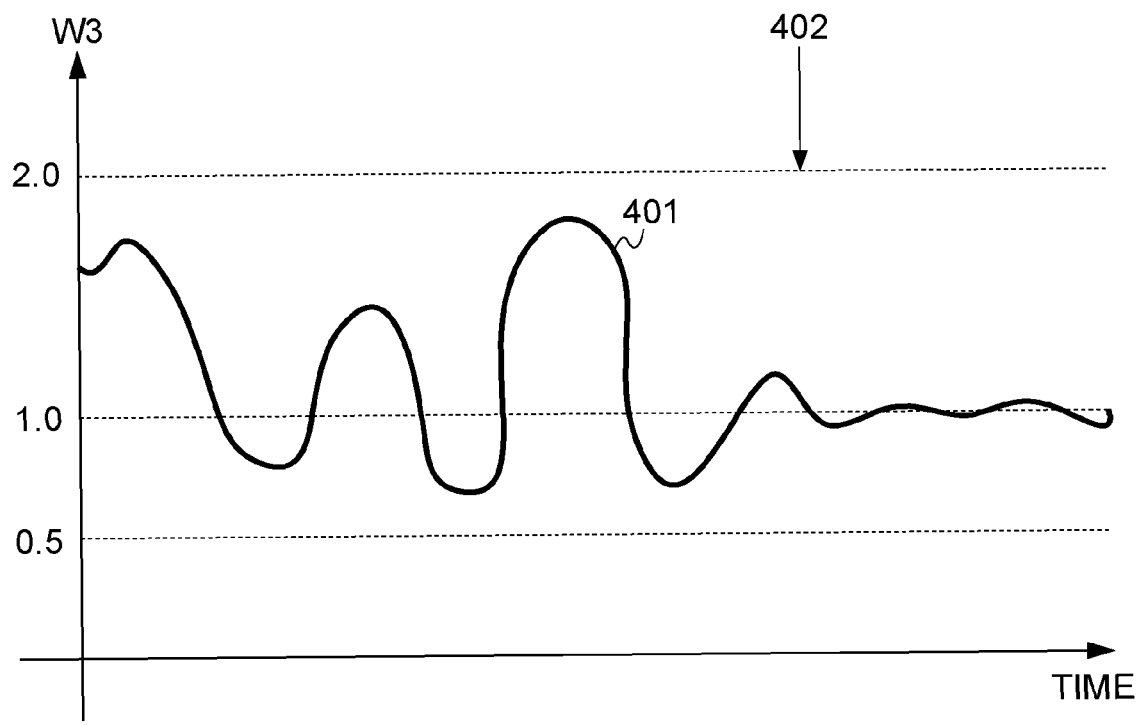
FIG. 4 is a diagram showing variations in weighting coefficient.

FIG. 4 is a diagram showing the weighting coefficient W3 which varies with time. A curve 401 represents variations in the weighting coefficient W3.

As shown in FIG. 4, if the sufficiency of the VBV buffer drops immediately before W3 reaches a value of 2.0 represented by a horizontal line 402, and an underflow is likely to occur, the VBV buffer controller 202 changes the value of W2 such that W3 has a value near 1.0. Thus, by performing control such that the value of W3 is closer to 1.0, the degree of change in Q-scale caused by variations in the value of W3 can be reduced and thus, the Q-scale determined from the filling level of the VBV buffer is output without being modified.

Figure 5:
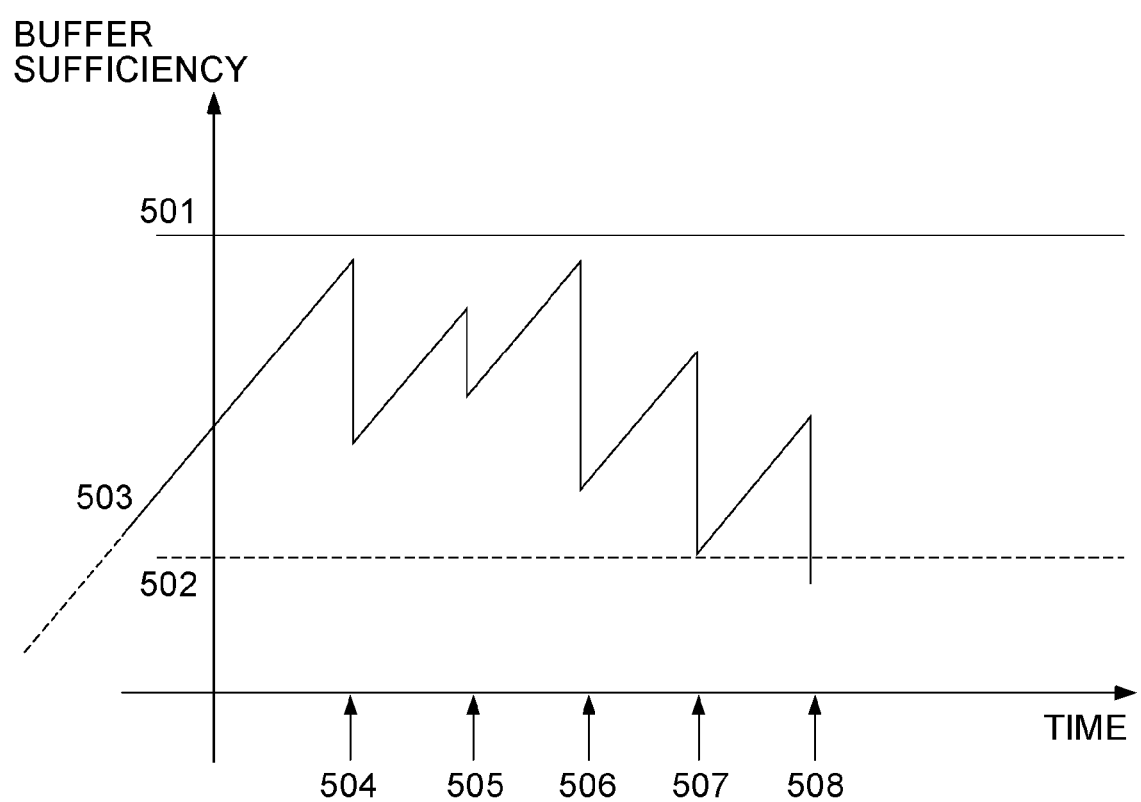
FIG. 5 is a diagram showing variations in the amount of codes stored in a VBV buffer.

FIG. 5 is a diagram showing the sufficiency of the VBV buffer. In the drawing, a solid horizontal line 501 represents the maximum size of the VBV buffer, while a dotted horizontal line 502 represents a threshold value. A zigzag line 503 represents the amount of codes stored in the VBV buffer. One screen of coded data is extracted from the VBV buffer at time points indicated by reference numerals 504 to 508.

When the amount of codes stored in the VBV buffer falls below the threshold value in the process during which coded data is sequentially extracted from the VBV buffer as described above, the VBV buffer controller 202 performs control such that the value of W3 remains close to 1.0.

Thus, in the present exemplary embodiment, a weighting coefficient determined from the activity of an image is converted according to the state of the VBV buffer. Then, the converted weighting coefficient is used to control the value of a Q-scale.

Therefore, compared to the case where the weighting coefficient is determined simply on the basis of the activity only, a quantization scale with more consideration given to the state of the VBV buffer can be set.

Therefore, coding can be performed with consideration given to image features and it is less likely that an underflow would occur in the VBV buffer.

While only one threshold value is provided in FIG. 5, a plurality of threshold values may be provided such that the VBV buffer controller 202 can perform control so as to gradually limit the variation range of the Q-scale every time the filling level of the VBV buffer falls below a threshold value.

Second Exemplary Embodiment

A second exemplary embodiment of the present invention will now be described. In the first exemplary embodiment described above, a weighting coefficient determined from the activity of an image is converted on the basis of the state of the VBV buffer. This can cause the value of W2 to be changed in the middle of one frame, and the improvement of image quality based on the use of activities may be less significant, particularly in MBs processed at a later stage in the processing of one screen.

Therefore, in the present exemplary embodiment, when the picture weighting determining unit 204 generates a weighting coefficient on the basis of an activity with respect to each MB, the activity to be supplied to the picture weighting determining unit 204 is converted according to the state of the VBV buffer.

Figure 3:
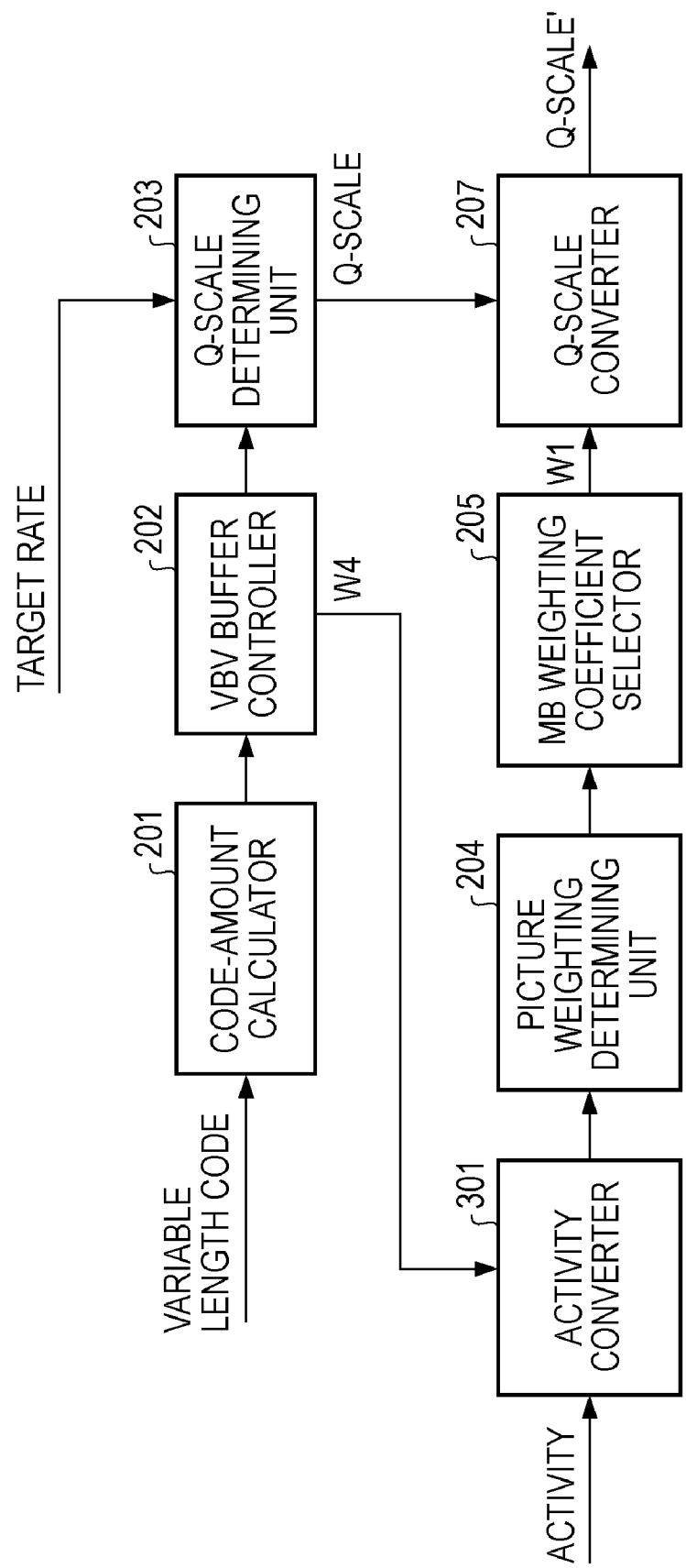
FIG. 3 illustrates another exemplary configuration of the rate controller.

FIG. 3 illustrates a configuration of a rate controller 113 according to the second exemplary embodiment. In FIG. 3, components similar to those of FIG. 2 are given the same reference numerals.

Referring to FIG. 3, the VBV buffer controller 202 estimates the state of the VBV buffer, generates a conversion coefficient W4 for each picture on the basis of the estimated state of the VBV buffer, and outputs the generated conversion coefficients W4 to an activity converter 301.

The activity converter 301 multiplies an activity from the activity detector 114 by the conversion coefficient W4 for each picture and uniformly converts weighting coefficients for all MBs in one frame. More, specifically, if the sufficiency of variable length codes in the VBV buffer is low and an underflow is likely to occur, the VBV buffer controller 202 sets the value of W4 such that the effect of the weighting coefficient W1 can be reduced.

On the other hand, if the sufficiency of codes in the VBV buffer is high, the VBV buffer controller 202 sets the value of W4 such that the variation range of a Q-scale which varies with the weighting coefficient W1 based on the activity can be limited.

The picture weighting determining unit 204 sets a weighting coefficient W1 for each MB on the basis of the converted activity. The MB weighting-coefficient selector 205 selects a weighting coefficient W1 for each MB and outputs the selected weighting coefficient W1 to the Q-scale converter 207. The Q-scale converter 207 performs the following operation using the Q-scale from the Q-scale determining unit 203 and the weighting coefficient W1 for the conversion of the Q-scale:

$$Q\text{-scale}' = Q\text{-scale} \times W3$$

The Q-scale' obtained in this manner is set, in the quantizer 104, as a quantization scale for the MB.

Thus, in the present exemplary embodiment, the activity of an image is converted according to the state of the VBV buffer. Then, a weighting coefficient determined from the converted activity is used to control the value of a Q-scale.

Therefore, compared to the case where the weighting coefficient is determined simply on the basis of the activity only, a quantization scale with more consideration given to the state of the VBV buffer can be set.

Therefore, coding can be performed with consideration given to image features and it is less likely that an underflow would occur in the VBV buffer.

Third Exemplary Embodiment

Figure 6:
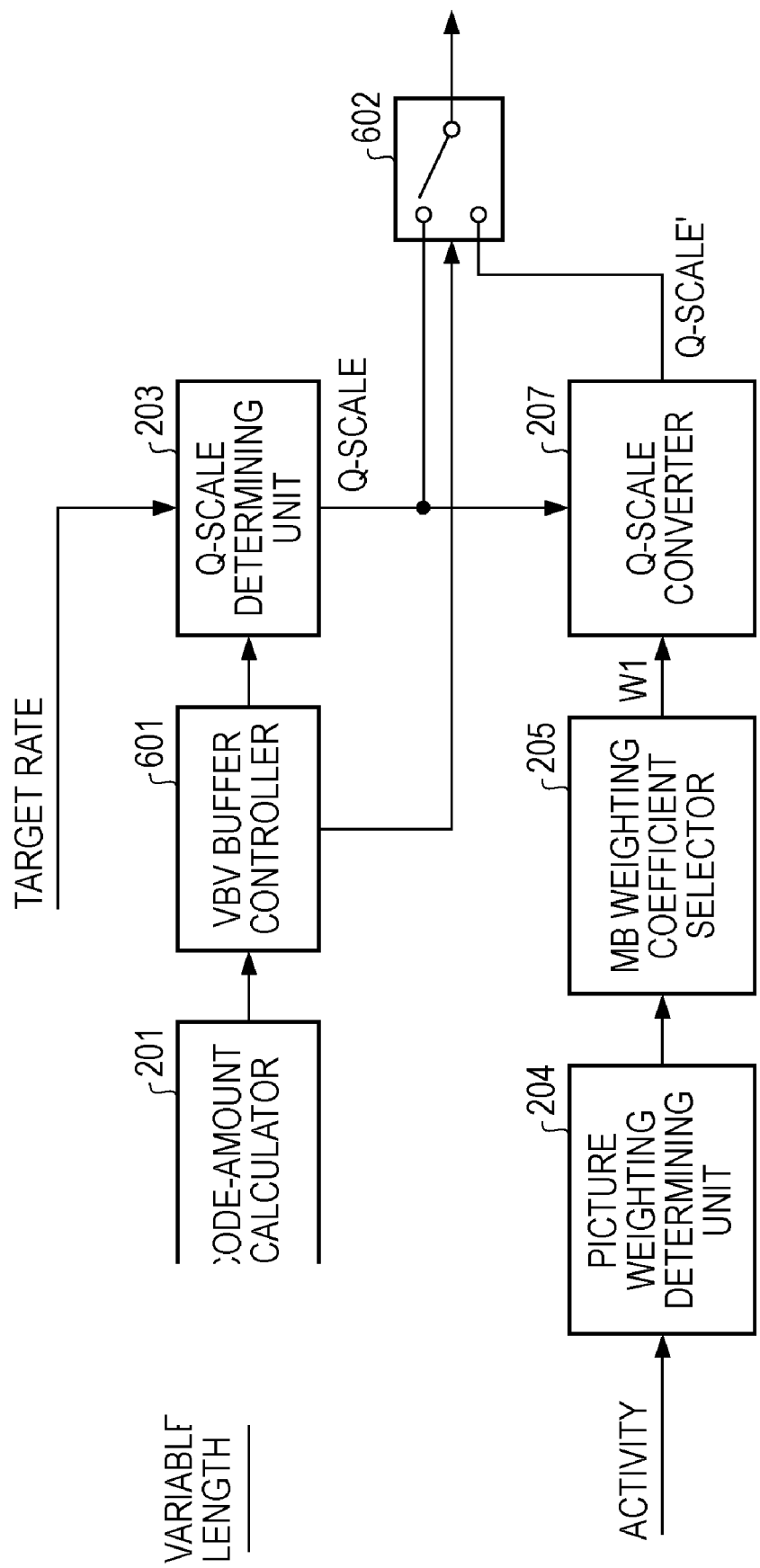
FIG. 6 illustrates another exemplary configuration of the rate controller.

A third exemplary embodiment of the present invention will now be described. FIG. 6 illustrates a configuration of a rate controller 113 according to the third exemplary embodiment. In FIG. 6, components similar to those of FIG. 2 are given the same reference numerals.

Referring to FIG. 6, the Q-scale determining unit 203 determines a Q-scale in a similar manner to those of the foregoing exemplary embodiments and outputs the determined Q-scale to a switch 602.

On the other hand, the Q-scale converter 207 performs an operation using a weighting coefficient W1 for each MB output from the MB weighting-coefficient selector 205 and a Q-scale value from the Q-scale determining unit 203 in a similar manner to that described above, and outputs the resulting Q-scale' to the switch 602.

Then, according to an instruction from a VBV buffer controller 601, the switch 602 selects either one of the Q-scale from the Q-scale determining unit 203 and the Q-scale' from the Q-scale converter 207.

The VBV buffer controller 601 estimates the filling level of the VBV buffer. If the filling level of the VBV buffer falls below a predetermined threshold value, the VBV buffer controller 601 controls the switch 602 to select the Q-scale output from the Q-scale determining unit 203.

On the other hand, if the filling level of the VBV buffer is equal to or greater than the threshold value, the VBV buffer controller 601 controls the switch 602 to select a Q-scale' output from the Q-scale converter 207.

Thus, in the present exemplary embodiment, whether the Q-scale converted using the weighting coefficient based on the activity is to be used is determined according to the filling level of the VBV buffer. More, specifically, if the filling level of the VBV buffer is low, it is determined that the converted Q-scale is not to be used. Thus, a quantization scale with more consideration given to the state of the VBV buffer can be set.

Therefore, coding can be performed with consideration given to image features and it is less likely that an underflow would occur in the VBV buffer.

Fourth Exemplary Embodiment

A fourth exemplary embodiment of the present invention will now be described. FIG. 7 illustrates a configuration of a rate controller 113 according to the fourth exemplary embodiment. In FIG. 7, components similar to those of FIG. 2 are given the same reference numerals.

Referring to FIG. 7, the Q-scale determining unit 203 determines a Q-scale in a similar manner to those of the foregoing exemplary embodiments and outputs the determined Q-scale to a multiplier 703.

On the other hand, the MB weighting-coefficient selector 205 generates a weighting coefficient W1 for each MP on the basis of the activity of an image and outputs the generated weighting coefficient W1 to one terminal of a switch 702. A value of 1.0 is supplied to the other terminal of the switch 702.

Then, according to an instruction from a VBV buffer controller 701, the switch 702 selects either one of the weighting coefficient W1 from the MB weighting-coefficient selector 205 and a coefficient of 1.0.

The multiplier 703 multiplies the Q-scale from the Q-scale determining unit 203 by the weighting coefficient W1 output from the switch 702 or by a coefficient of 1.0, and outputs a Q-scale'.

The VBV buffer controller 701 estimates the filling level of the VBV buffer. If the filling level of the VBV buffer falls below a predetermined threshold value, the VBV buffer controller 701 controls the switch 702 to select a coefficient of 1.0.

On the other hand, if the filling level of the VBV buffer is equal to or greater than the threshold value, the VBV buffer controller 701 controls the switch 702 to select the weighting coefficient W1.

Thus, in the present exemplary embodiment, a coefficient by which a Q-scale is to be multiplied is selected according to the filling level of the VBV buffer. More, specifically, if the filling level of the VBV buffer is low, the VBV buffer controller 701 performs control, by allowing the Q-scale to be multiplied by a coefficient of 1.0, such that an activity causes virtually no variation in Q-scale. Thus, a quantization scale with more consideration given to the state of the VBV buffer can be set.

In the exemplary embodiments described above, the present invention is applied to the apparatus capable of coding moving image signals according to the MPEG2 standard. The present invention is also applicable to other types of apparatuses and systems capable of coding moving image signals by using quantization and variable length coding techniques according to a standard, such as the MPEG4-AVC standard, and provides similar effects.

In this case, a means for monitoring the data rate of coded moving image data, instead of estimating the filling level of the VBV buffer, may be provided. Then, control may be performed such that the degree of change in the quantization scale caused by use of the activity can be reduced as the data rate decreases.

Specifically, the data rate is calculated on the basis of the amount of codes generated per unit time. Then, control is performed such that if the data rate becomes equal to or lower than a predetermined threshold value, the degree of change in the quantization scale caused by use of the activity is reduced.

Other Exemplary Embodiments

The exemplary embodiments of the present invention described above may be also implemented by supplying, to a system or apparatus, a storage medium on which software program code embodying the functions of the above-described embodiments is recorded. The functions of the above-described embodiments can be performed when a computer (central processing unit (CPU) or micro-processing unit (MPU)) of the system or apparatus reads and executes the program code stored in the storage medium. In this case, the program code read out of the storage medium implements the functions of the above-described embodiments and thus, the storage medium on which the program code is stored constitutes the present invention. Examples of storage media to be used for supplying such program code include a floppy (registered trademark) disk, a hard disk, an optical disk, a magneto-optical disk, a compact-disk read-only memory (CD-ROM), a CD-recordable (CD-R), a magnetic tape, a nonvolatile memory card, and a ROM.

In addition to the cases where the functions of the above-described embodiments are performed when a computer reads and executes the program code, there are other cases where the functions of the above-described embodiments are performed. For example, on the basis of instructions of the program code, an operating system (OS) running on the computer carries out all or part of the actual processing. This also allows the functions of the above-described embodiments to be performed.

Moreover, the functions of the above-described embodiments may be performed when the program code read out of a storage medium is written in a function expansion board in a computer or in a memory of a function expansion unit connected to a computer and then, on the basis of instructions of the program code, the function expansion board or a CPU in the function expansion unit carries out all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-022508 filed Jan. 31, 2006 and No. 2006-348890 filed Dec. 26, 2006, which are hereby incorporated by reference herein in their entirety.

What is claimed is:

1. An image processing apparatus comprising:
    a quantizing unit configured to quantize an input moving image signal using a set quantization scale;
    a coding unit configured to perform variable length coding on an output of the quantizing unit;
    an activity detecting unit configured to detect an activity of the input moving image signal;
    a weighting determining unit configured to determine, based on the activity detected by the activity detecting unit, a weighting coefficient for determining an effect of the activity and variable range thereof with respect to each macroblock which is a unit for coding the input moving image signal;
    a quantization-scale determining unit configured to determine the quantization scale with respect to each macroblock on basis of an amount of variable length codes output from the coding unit;
    a filling level detecting unit configured to detect, on basis of the amount of variable length codes output from the coding unit, whether a filling level of codes in a virtual buffer in a decoder which decodes the coded moving image signal falls below a predetermined threshold value, and to set a control parameter to change the weighting coefficient with respect to each macroblock determined by the weighting determining unit; and
    a changing unit configured to change the weighting coefficient with respect to each macroblock based on the control parameter, and to change the quantization scale with respect to each macroblock determined by the quantization-scale determining unit in accordance with the changed weighting coefficient,
    wherein, when the filling level falls below the predetermined threshold value, the filling level detecting unit sets the control parameter so as to decrease an effect of the weighting coefficient for the quantization scale by narrowing the variable range of the weighting coefficient, and when the filling level does not fall below the predetermined threshold value, the filling level detecting unit sets the control parameter so as to keep an effect of the weighting coefficient for the quantization scale by keeping the variable range of the weighting coefficient.

2. The image processing apparatus according to claim 1, wherein the changing unit comprises:
    a weighting coefficient changing section; and
    a quantization-scale changing section,
    wherein the filling level detecting unit controls the weighting coefficient changing section by using the control parameter such that a range in which the quantization scale changes on the basis of the weighting coefficient is narrowed when the filling level falls below the predetermined threshold value.

3. The image processing apparatus according to claim 2, wherein the filling level detecting unit controls the coefficient changing section by using the control parameter such that if the filling level falls below the predetermined threshold value, a range in which the quantization scale changes on the basis of the weighting coefficient becomes narrower than in the case where the filling level is equal to or greater than the predetermined threshold value.

4. An image processing method comprising:
    quantizing an input moving image signal using a set quantization scale;

performing variable length coding on the quantized moving image signal;

detecting an activity of the input moving image signal;

determining, based on the detected activity, a weighting coefficient for determining an effect of the activity and variable range thereof with respect to each macroblock which is a unit for coding the input moving image signal;

determining the quantization scale with respect to each macroblock on basis of an amount of variable length codes obtained from performing variable length coding on the quantized moving image signal;

detecting, on basis of the amount of variable length codes, whether a filling level of codes in a virtual buffer in a decoder which decodes the coded moving image signal falls below a predetermined threshold value, and setting a control parameter to change the weighting coefficient with respect to each macroblock; and changing the weighting coefficient with respect to each macroblock based on the control parameter, and changing the quantization scale with respect to each macroblock in accordance with the changed weighting coefficient, wherein, when the filling level falls below the predetermined threshold value, the control parameter is set so as to decrease an effect of the weighting coefficient for the quantization scale by narrowing the variable range of the weighting coefficient, and when the filling level does not fall below the predetermined threshold value, the control parameter is set so as to keep an effect of the weighting coefficient for the quantization scale by keeping the variable range of the weighting coefficient.

5. A non-transitory computer readable storage medium containing computer-executable instructions for coding images, the medium comprising:

computer-executable instructions for quantizing an input moving image signal using a set quantization scale;

computer-executable instructions for performing variable length coding on the quantized moving image signal;

computer-executable instructions for detecting an activity of the input moving image signal;

computer-executable instructions for determining, based on the detected activity, a weighting coefficient for determining an effect of the activity and variable range thereof with respect to each macroblock which is a unit for coding the input moving image signal;

computer-executable instructions for determining the quantization scale with respect to each macroblock on basis of an amount of variable length codes obtained from performing variable length coding on the quantized moving image signal;

computer-executable instructions for detecting, on basis of the amount of variable length codes, whether a filling level of codes in a virtual buffer in a decoder which decodes the coded moving image signal falls below a predetermined threshold value, and setting a control parameter to change the weighting coefficient with respect to each macroblock; and computer-executable instructions for changing the weighting coefficient with respect to each macroblock based on the control parameter, and changing the quantization scale with respect to each macroblock in accordance with the changed weighting coefficient, wherein, when the filling level falls below the predetermined threshold value, the control parameter is set so as to decrease an effect of the weighting coefficient for the quantization scale by narrowing the variable range of the weighting coefficient, and when the filling level does not fall below the predetermined threshold value, the control parameter is set so as to keep an effect of the weighting coefficient for the quantization scale by keeping the variable range of the weighting coefficient.

* * * * *